United States Patent [19]
Furuhata et al.

[11] Patent Number: 5,374,955
[45] Date of Patent: Dec. 20, 1994

[54] HIGH-DEFINITION IMAGING DEVICE, AND APPARATUSES FOR RECORDING AND PLAYING BACK HIGH-DEFINITION PICTURE INFORMATION

[75] Inventors: Takashi Furuhata, Kamakura; Nobuo Azuma, Yokohama; Hiroki Mizosoe, Kawasaki; Manabu Katsuki, Yokohama, all of Japan

[73] Assignee: Hitachi, Ltd., Tokyo, Japan

[21] Appl. No.: 160,806

[22] Filed: Dec. 3, 1993

[51] Int. Cl.$^5$ ............................................. H04N 9/09
[52] U.S. Cl. ................................ 348/264; 348/234; 348/238; 358/906
[58] Field of Search ............... 348/264, 234, 238; 358/906; H04N 9/68, 5/247, 9/09, 9/097

[56] References Cited

U.S. PATENT DOCUMENTS

| | | | |
|---|---|---|---|
| 3,975,760 | 8/1976 | Yamanaka et al. | 358/41 |
| 4,236,176 | 11/1980 | Nagumo | 358/43 |
| 4,345,270 | 8/1982 | Nagumo et al. | 358/44 |
| 4,507,679 | 3/1985 | Bendell | 358/55 |
| 4,725,880 | 2/1988 | Dischert | 358/43 |

OTHER PUBLICATIONS

"Technical reports of the Institute of Television of Japan, vol. 16, No. 18-Technical Reports relevant to Solid-state Imaging", Feb. 1992, pp. 1-49.

*Primary Examiner*—James J. Groody
*Assistant Examiner*—Sherrie Hsia
*Attorney, Agent, or Firm*—Antonelli, Terry, Stout & Kraus

[57] ABSTRACT

Solid-state imaging elements each having a smaller number of pixels are employed to realize an imaging device for taking a high-definition picture which is four or more times larger in the number of pixels than each of the solid-state imaging elements, and also an apparatus for recording/playing back (or transmitting) the high-definition picture. A two-dimensional space which includes, at least, nH spatial sampling points in a horizontal direction and nV spatial sampling points (nV lines) in a vertical direction, totaling (nH×nV) spatial sampling points, is imaged under the condition that light is sensed at, at most, ½ of the sampling points of the two-dimensional space. Thus, the imaging device delivers as its output a video signal containing effective pixel information items which correspond to the light-sensed sampling points and which are, at most, (nH×nV)/2 in terms of the number of pixels.

16 Claims, 8 Drawing Sheets

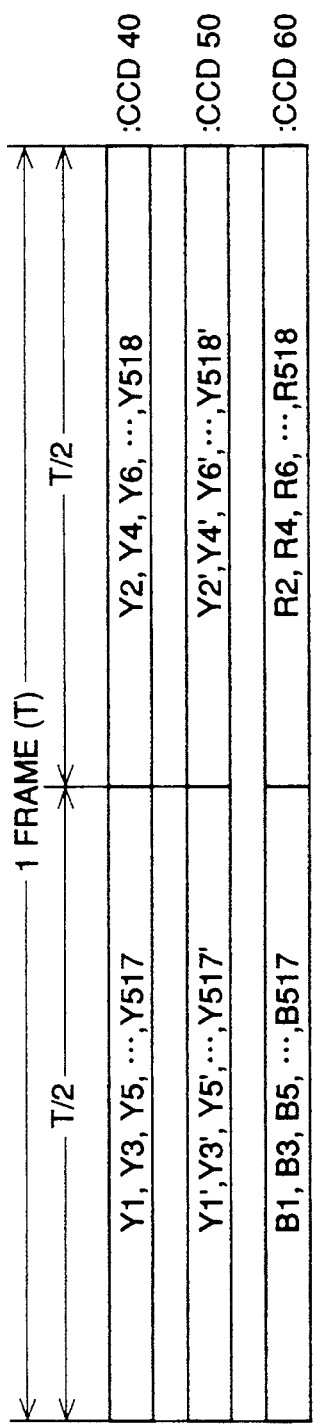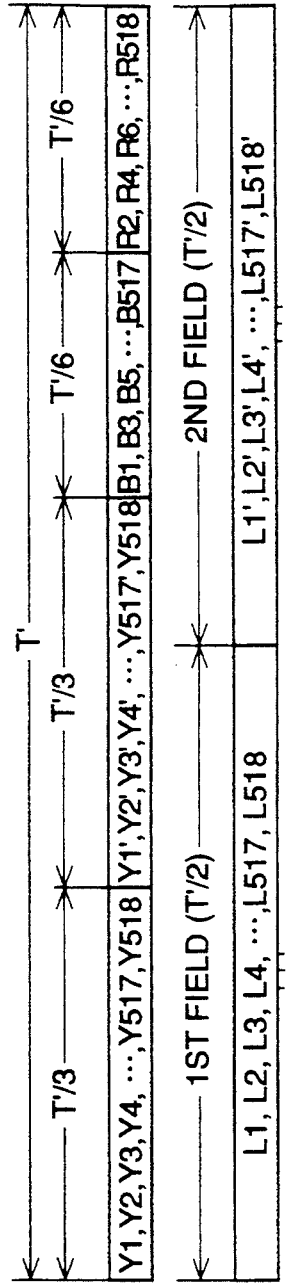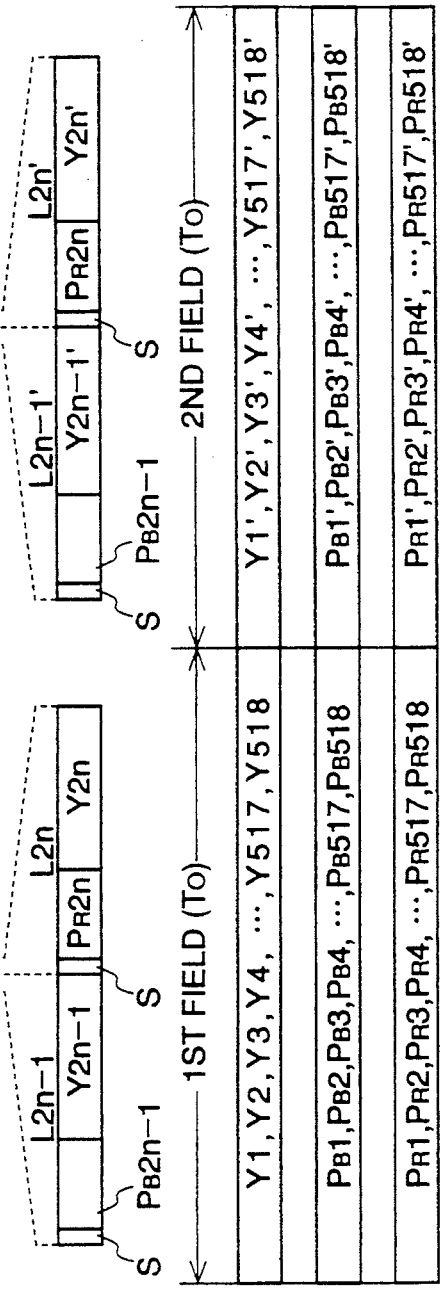

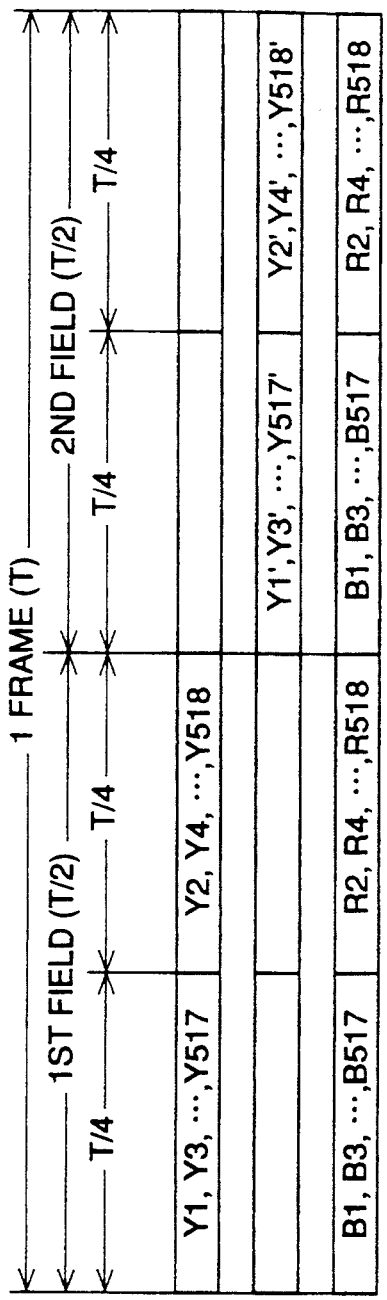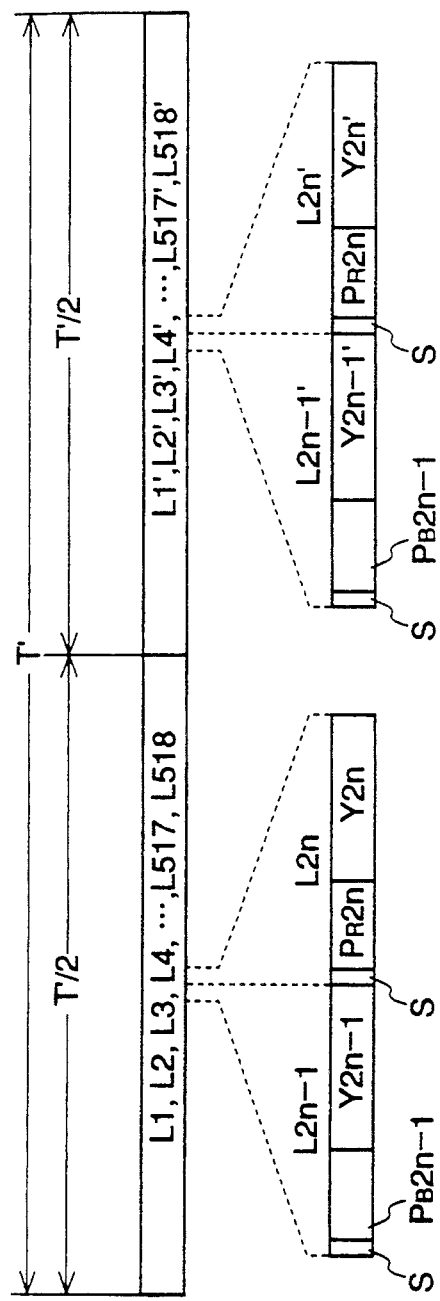
FIG. 6(a)
FIG. 6(b)
FIG. 6(c)
FIG. 6(d)
FIG. 6(e)

HIGH-DEFINITION IMAGING DEVICE, AND APPARATUSES FOR RECORDING AND PLAYING BACK HIGH-DEFINITION PICTURE INFORMATION

BACKGROUND OF THE INVENTION

2. Description of the Related Art

The present invention relates to a solid-state imaging device for taking a picture of high definition. Also, it relates to an apparatus for recording, playing back or transmitting high-definition picture information by the use of the solid-state imaging device.

2. Description of the Related Art

As solid-state imaging cameras which conform to existing television systems (such as the NTSC system), ones employing MOS-type or CCD-type solid-state imaging elements having between 200,000 and 400,000 pixels have already been put into practical use and become commercially available.

On the other hand, as solid-state imaging cameras of high definition which take pictures at definitions being four times or more higher than in the conventional cameras, in conformity with next-generation television systems for high-definition television such as "Hi-vision" named by NHK (Nippon Hoso Kyokai), ones employing solid-state imaging elements having between 1,500,000 and 2,000,000 pixels have been manufactured by way of trial and have been reported as stated in, for example, Proceedings "Technical Reports of the Institute of Television of Japan, V. 16, N. 18—Technical Reports relevant to Solid-state Imaging".

Known technical reports and manufactural trials, however, do not necessarily contain satisfactory consideration and contrivances for realizing the high-definition solid-state imaging camera at low cost and at an early stage.

SUMMARY OF THE INVENTION

The realization of the high-definition solid-state imaging camera as stated above necessitates a solid-state imaging element of larger size in which the number of pixels is four times or more larger than in the conventional element. This leads to the problem that the new element needs to be developed, so enormous expenses for the development are involved, and the problem that a considerable time period is required until the new element is put into practical use, so the early implementation of the camera is difficult. Other problems are that the larger size of the new element, the more the size of an apparatus for recording or/and playing back the picture of high definition increase, and the more the cost of the new element increases, making it difficult to lower the price of the apparatus.

In view of the above problems, the present invention has for its object to provide a high-definition imaging device and an apparatus capable of recording/playing back (or transmitting) a high-definition picture, the device and the apparatus being realized at a comparatively low cost and being supplied early in such a way that solid-state imaging elements having around, for example, 400,000 pixels employed in conventional television systems are utilized without increasing the number of pixels of each solid-state imaging element.

In general, in a case where a high-definition video signal produced by the imaging of a high-definition imaging camera the pixels of which are four times or more larger in number than those of a conventional imaging camera is to be recorded on a record medium (or to have its information transmitted), it can be recorded (or transmitted) by effectively curtailing the number of pixels without the degradation of a picture quality. Herein, the vision characteristics of man are exploited to apply a kind of band compression technique which makes it unnecessary to record (or transmit) all the pixels.

With note taken of the characteristics of human vision, the present invention curtails the effective number of imaging pixels. More specifically, a two-dimensional space which includes nH spatial sampling points in a horizontal direction (nH/2 in terms of the number of horizontal spatial cycles) and nV spatial sampling points in a vertical direction (nV/2 in terms of the number of vertical spatial cycles), totaling (nH×nV) spatial sampling points, is imaged by two, first and second solid-state imaging elements each of which has (nH×nV)/4 pixels, in a positional relationship in which the imaging elements have their spatial sampling points offset in the horizontal and vertical directions from each other, thereby producing, for example, a luminance signal (Y) which contains (nH×nV)/2 effective pixel information items concerning luminance information. In addition, a color signal (C) which contains (nH×nV)/4 effective pixel information items concerning color information is produced by a third solid-state imaging element which has (nH×nV)/4 pixels. A video signal consisting of the luminance signal (Y) and the color signal (C), the information contents of which have been reduced by the curtailed numbers of pixels based on the above imaging, is recorded (or transmitted) through proper processing in which the information contents are held reduced without pixel restoration by way of example. In playing back the recorded signal, those of the (nH×nV) spatial sampling points which have been omitted without being imaged are played back through pixel interpolations, thereby obtaining a picture of high definition in which the pixel information items of all the sampling points are restored.

Owing to the pixel curtailment technique and the pixel restoration technique stated above, the conventional solid-state imaging elements having around, for example, 400,000 pixels can be used for realizing a high-definition solidstate imaging camera which can take the high-definition picture equivalent to 1,600,000 pixels being four times larger in number. In addition, since the high-definition picture whose information content has been reduced into a narrow band owing to the curtailed number of pixels is obtained by the imaging, the signal band of a recording (or transmission) system can be widely compressed, so that a recording (or transmission) apparatus can be realized with ease and at low cost. Besides, regarding the recording (or transmission) capacity of a record (or transmission) medium for picture information, in the case of recording still pictures, the number of still pictures to be recorded can be enlarged, and in the case of recording moving pictures, the picture recording time period of the moving pictures can be lengthened. Further, in the case of transmitting the high-definition picture, the transmission rate of the information thereof can be lowered to shorten a transmission time period, thereby bringing forth the subsidiary effect that the running cost of the record (or transmission) medium can be curtailed.

BRIEF DESCRIPTION OF THE DRAWINGS

FIGS. 4(a) thru 4(i) are operating diagrams showing the timings of that high-definition video signal (video information items) of the taken still picture which is delivered from the embodiment of the imaging device;

FIGS. 6(a) thru 6(e) are operating diagrams showing the timings of that high-definition video signal (video information items) of a taken picture which is delivered on the basis of another embodiment of the present invention;

PREFERRED EMBODIMENTS OF THE INVENTION

Figure 1:
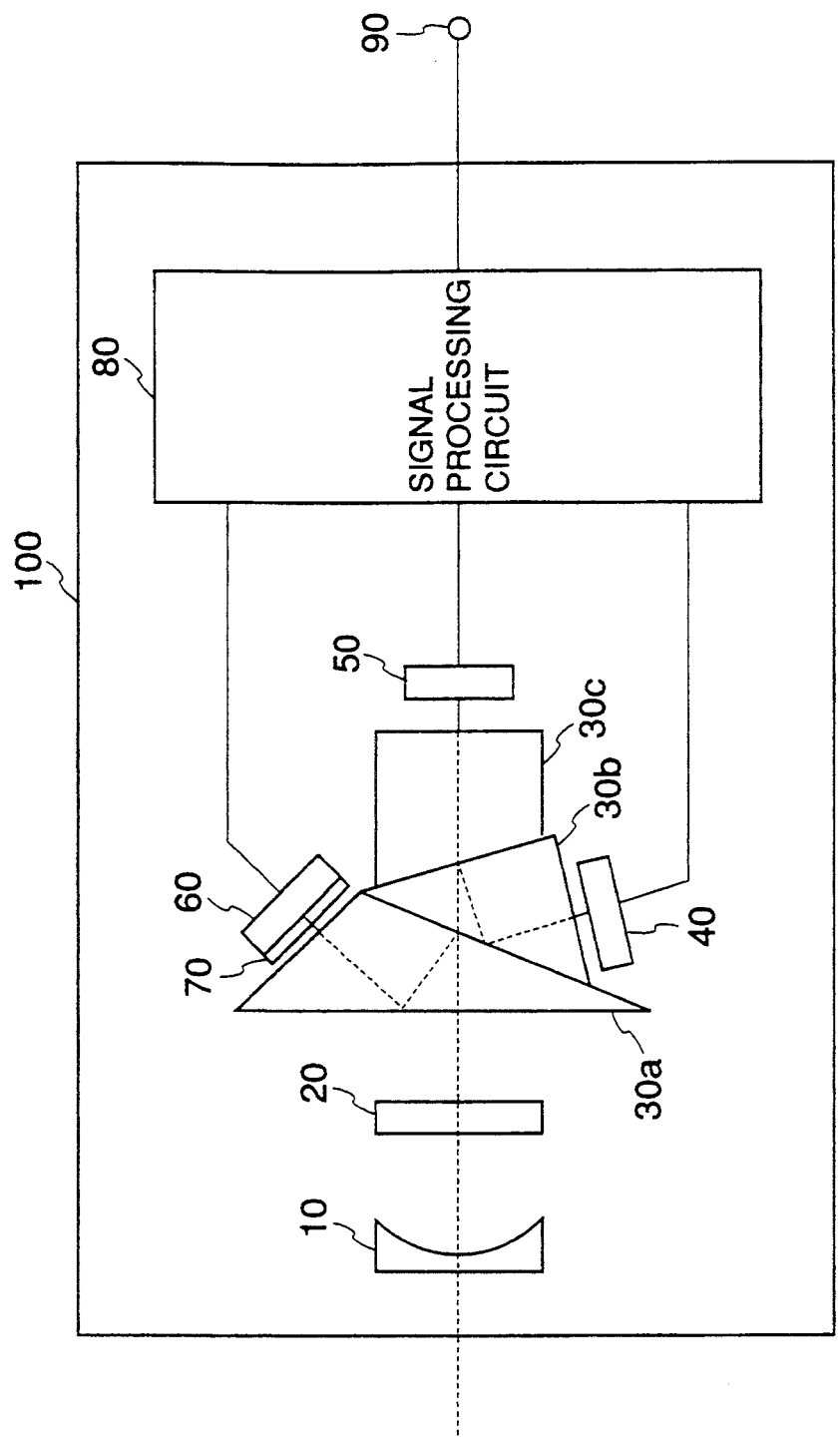
FIG. 1 is a diagram showing the optical and electrical arrangement of an embodiment of a high-definition solid-state imaging device according to the present invention.
Figure 2:
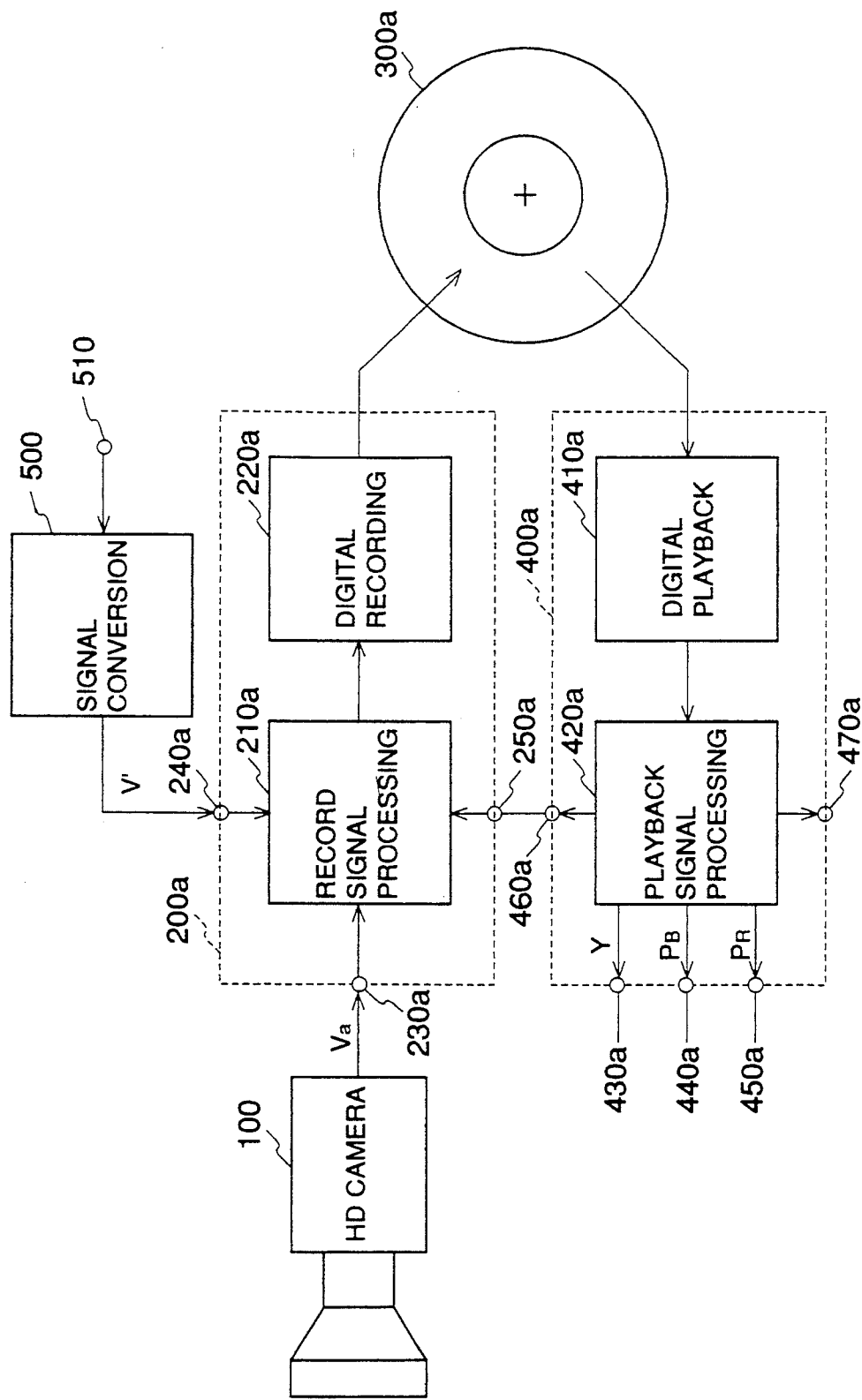
FIG. 2 is a schematic block diagram showing an embodiment of an apparatus for recording and playing back a still picture of high definition according to the present invention.
Figures 3A, 3B:
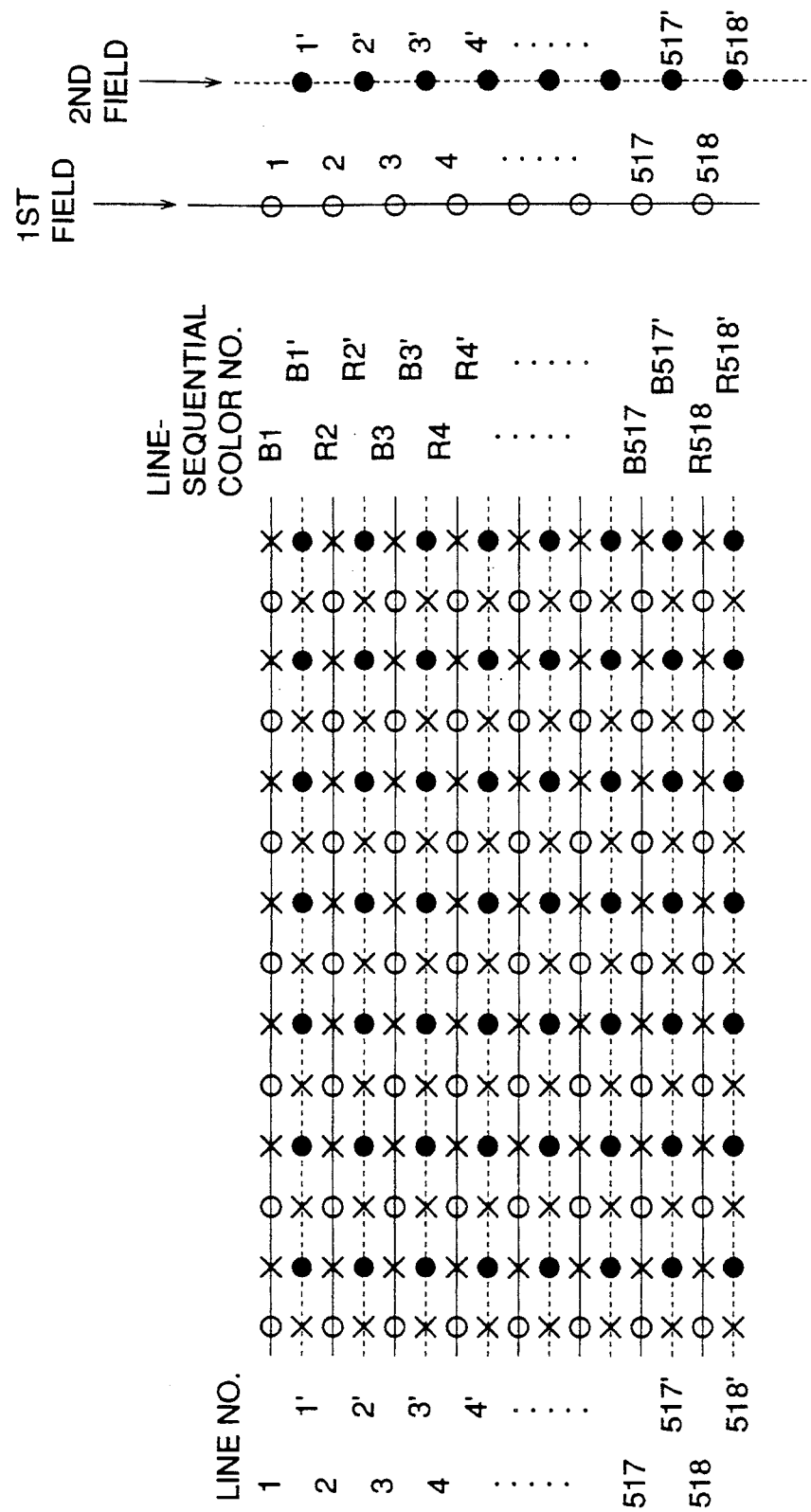
FIGS. 3(a) and 3(b) are explanatory diagrams showing the spatial sampling points and pixels of a two-dimensional picture which is taken by the embodiment of the imaging device.

Now, embodiments of the present invention will be described in conjunction with the accompanying drawings. FIG. 1 is a diagram showing one embodiment of a high-definition solid-state imaging device (hereinbelow, termed "HD camera") 100 according to the present invention, while FIG. 2 is a diagram showing one embodiment in the case where the present invention is applied to an apparatus (hereinbelow, termed "HD still camera") in which a still picture of high definition being as wide as an aspect ratio of 16:9 is recorded and played back by the use of the HD camera 100. FIGS. 3(a) and 3(b) are diagrams schematically showing the relationships among the pixels of a two-dimensional picture taken by the HD camera 100, in the horizontal direction thereof and the scanning lines (hereinbelow, simply termed "lines") of the two-dimensional picture in the vertical direction thereof, the Nos. of the lines, and the Nos. of line-sequential color signals. FIGS. 4(a) thru 4(i) are diagrams exemplifying the timings of that high-definition video signal (video information items) of the taken still picture which is delivered from the HD camera 100.

Referring to FIG. 1, the HD. camera 100 includes a lens 10, an optical filter 20 having optical low-pass characteristics, and prisms 30a, 30b and 30c.

Each of numerals 40, 50 and 60 indicates a two-dimensional or a real solid-state imaging element. In this embodiment, the solid-state imaging element is one of the CCD (Charge-Coupled Device) type whose effective pixels number 800 in the horizontal direction of the element and 518 in the vertical direction thereof (corresponding to 518 lines), totaling 800×518 (about 400,000 pixels). Optical images having passed through the optical elements 10, 20, 30a, 30b and 30c are simultaneously formed on the three CCD's 40, 50 and 60 at the aspect ratio of 16:9, whereby imaging signals are obtained.

Among the three CCD's, the two 40 and 50 produce the imaging signals concerning luminance information. Therefore, the CCD's 40 and 50 need not always be furnished with color filters. As will be explained later, however, the photosensitive faces (not shown) of the CCD's 40 and 50 may well be furnished with, for example, G filters for deriving green (G) information as the first color information C1.

As illustrated in FIGS. 3(a) and 3(b), the two CCD's 40 and 50 are respectively mounted on the prisms 30b and 30c in the state in which they are spatially offset or staggered ½ pixel pitch in the horizontal direction and also ½ pixel pitch in the vertical direction from each other. Thus, the pixels of marks "○" (white dots) indicated at line Nos. 1, 2, 3, ..., and 518 by solid lines in FIG. 3(a) (hereinbelow, these pixels shall be termed the "pixels of odd-numbered fields" (the first field shown in FIG. 3 (b) )) are read or fetched from the CCD 40, while the pixels of marks "●" (black dots) indicated at line Nos. 1', 2', 3', ..., and 518' by broken lines in FIG. 3(a) (hereinbelow, these pixels shall be termed the "pixels of even-numbered fields" (the second field shown in FIG. 3(b) )) are read or fetched from the CCD 50.

On the other hand, the CCD 60 produces the imaging signal concerning color information. Therefore, the photosensitive face of the CCD 60 is furnished with a color filter 70 for separating the color information. In this embodiment, the color filter 70 is so constructed that a B filter for deriving blue (B) information as the second color information C2, and an R filter for deriving red (R) information as the third color information C3 are respectively formed of stripes each extending in, for example, the horizontal direction. More concretely, the CCD 60 is mounted on the prism 30a in such a positional relationship that the pixels thereof are substantially in spatial coincidence with the pixels of the CCD 40 as indicated by the marks "○" in FIG. 3(a). In addition, the striped color filter 70 is mounted on the photosensitive face of the CCD 60 in such a positional relationship that the B filter corresponds to the even-numbered lines 1, 3, 5, ..., and 517 indicated by the line-sequential color Nos. in FIG. 3(a), while the R filter corresponds to the even-numbered lines 2, 4, 6, ..., and 518.

Owing to the above arrangement, an imaging region having spatial sampling points, which number nH=800×2=1600 (pixels) in the horizontal direction and nV=518×2=1036 (lines) in the vertical direction, totaling 1600×1036 (about 1,600,000 pixels), is spatially secured in correspondence with one still picture. Among the total number of pixels, about 400,000 pixels equal to ¼ thereof are actually read or fetched from each of the CCD's 40, 50 and 60 in sequence. By the way, "one still picture" as mentioned above shall be termed "one frame" below. In general, the picture of one frame is configured of two fields interlaced with each other, that is, two pictures of the first field indicated at the solid lines in FIGS. 3(a) and 3 (b) and the second field indicated at the broken lines.

Regarding the luminance information (Y), about 800,000 pixels equal to ½ of the total number of pixels per frame are effectively imaged and read by the two CCD's 40 and 50. Besides, regarding the color information (C), the two sorts of color information (B and R) each corresponding to about 200,000 pixels equal to ¼ of the total number of pixels per frame are imaged and read in line sequence.

Letter T is let denote a scanning time period in which the CCD's 40, 50 and 60 read the two-dimensional picture of one frame as stated above. Then, as shown in timing charts of FIGS. 4 (a) thru 4 (i), the pixels of all the lines (800,000 pixels in total, corresponding to 518×2 lines) are read as the luminance information (Y) in the scanning time period T. In this embodiment, as indicated in FIG. 4(a), the pixels of luminance on the odd-numbered lines (200,000 pixels Y1, Y3, Y5, ..., and Y517) are independently fetched from the CCD 40 in a time period of T/2, while the pixels of luminance on the even-numbered lines (200,000 pixels Y2, Y4, Y6, ..., and Y518) are independently fetched therefrom in the next half time period of T/2. Accordingly, the pixels totaling 400,000 per frame are read in the time period T by the CCD 40. Likewise, as indicated in FIG. 4 (b), the pixels of luminance on the odd-numbered lines (200,000 pixels Y1', Y3', Y5', ..., and Y517') are independently fetched from the CCD 50 in the time period of T/2, while the pixels of luminance on the even-numbered lines (200,000 pixels Y2', Y4', Y6', ... and Y518') are independently fetched therefrom in the next half time period of T/2. Accordingly, the pixels totaling 400,000 per frame are read in the time period T by the CCD 50.

In this manner, as to the luminance information Y, 800,000 pixels corresponding to the 1036 lines in total are read per frame (400,000 pixels corresponding to the 518 lines are read per field). It is accordingly possible to obtain a luminance signal whose signal band is compressed owing to the curtailment of pixels numbering ½ of the number (nH×nV) of the two-dimensional spatial sampling points to-be-imaged.

On the other hand, as to the color information, optical images which have passed through the B filter and R filter of the color filter 70 in alternate line units are taken by the CCD 60. Therefore, pixels of lines (259 lines) numbering ½ of the number of lines in the case of the luminance information Y are read as each of the blue information (B) and the red information (R). In this embodiment, as indicated in FIG. 4 (c), the pixels of blue information on the odd-numbered lines (200,000 pixels B1, B3, B5, ..., and B517) are independently fetched from the CCD 60 in the time period of T/2, while the pixels of red information on the even-numbered lines (200,000 pixels R2, R4, R6, ..., and R518) are independently fetched therefrom in the next half time period of T/2.

In this manner, the blue information B of the 200,000 pixels corresponding to the 259 lines in total per frame is read as the second color information C2, and the red information R of the 200,000 pixels corresponding to the 259 lines in total per frame is similarly read as the third color information C3. By the way, in this embodiment, in order to curtail the number of pixels of the color information, the color information is read in only the first field (the field indicated by the solid lines in FIG. 3(a)) as stated above, and no signal is read in the second field (the field indicated by the broken lines in FIG. 3(a)). Accordingly, the amount of each of the two sorts of color information B and R is curtailed to ¼ of the information content of the luminance information Y, and the output signal thereof has a signal band which is further compressed to ¼ of the signal band of the luminance information Y.

Moreover, owing to the above arrangement, the line sequential reading in which the color information items B and R are alternately delivered in scanning line units every frame (the method in which the pixels are read in the order of B1, R2, B3, R4, ..., B517, and R518 as indicated by the line-sequential color Nos. in FIG. 3(a)) is realized with ease.

The aforementioned luminance information (Y) and color information (B and R) fetched from the CCD's with the picture or one frame as a unit are supplied to a signal processing circuit 80 shown in FIG. 1, and they are properly processed therein. In this embodiment, they are converted into the video signal of a single channel as shown in FIG. 4 (d) or 4 (e), and the video signal is delivered as the output of the HD camera 100.

In the case of FIG. 4 (d), the output sequence of line 10 units is changed by the signal processing circuit 80 as follows: Letting symbol T' denote the basic cycle of one frame of the video signal to-be-delivered, the luminance signal components Y1, Y2, Y3, Y4, ..., Y517 and Y518 of the P first field are output in the first time period of T'/3, and the luminance signal components Y1', Y2', Y3', Y4', ..., Y517' and Y518' of the second field are output in the next time period of T'/3. Further, the blue signal components B1, B3, B5, ..., and B517 of the first field are output in the subsequent time period of T'/6, and the red signal components R2, R4, R6, ..., and R518 of the first field are output in the still subsequent time period of T'/6. The above video signal converted into the single channel is supplied from a terminal 90 shown in FIG. 1.

On the other hand, in the case of FIG. 4 (e), the output sequence of line units is changed by the signal processing circuit 80 as follows: Signal components are output in the sequence of the lines L1, L2, L3, L4, ..., L517 and L518 in that time period of the first field which is the first time period of T'/2, and signal components are output in the sequence of the lines L1', L2', L3', L4', ..., L517' and L518' in that time period of the second field which is the next time period of T'/2. Regarding the signal components, as shown in FIG. 4(f), a time base in line units is changed by the signal processing circuit 80 so as to convert the luminance information (Y) and the color information (B and R) into the signal of channel (which shall be termed "time-division multiplexing signal" below). The time-division multiplexing signal is such that the luminance signal Y, a signal ("PB signal") relevant to a color difference signal B - Y, and a signal ("PR signal") relevant to a color difference are subjected to time-division multiplexing in line units. This time-division multiplexing signal is externally supplied from the terminal 90. It will be explained more concretely with reference to FIG. 4(f). In general, a signal obtained by the time-division multiplexing of the color signal PB and the luminance signal Y is output at the odd-numbered ((2n−1)th) line L2n−1 of the first field, while a signal obtained by the time-division multiplexing of the color signal PR and the luminance signal Y is output at the even-numbered (2nth) line L2n. Likewise, a signal obtained by the time-division multiplexing of the color signal PB' and the luminance signal Y is output at the oddnumbered ((2n−1)'th) line L2n−1' of the second field, while a signal obtained by the time-division multiplexing of the color signal PR' and the luminance signal Y is output at the even-numbered (2n'th) line L2n'. By the way, since the color information of the second field is not read in this embodiment as stated before, the processing of the signal processing circuit 80 is so executed that, as indicated in FIG. 4 (f), the same signals as the odd-numbered ((2n−1)th) color signal component PB2n−1 and the even-numbered (2nth) color signal component PR2n of the first field are respectively afforded as the interpolative outputs of the odd-numbered ((2n−1)'th) color signal component PB2n' and the even-numbered (2n'th) color signal component PR2n' of the second field. Further, predetermined items of synchronizing information (a signal indicated by letter S in FIG. 4 (f)) such as horizontal synchronizing information, burst information and vertical synchronizing information are multiplexed on the time-division multiplexing signal explained above.

Each of the aforecited signals shown in FIGS. 4(d) and 4(e) is output as the single-channel signal. Accordingly, this embodiment can be connected to another equipment by only one connection line laid from the terminal 90, to bring forth the subsidiary effect that the interface of the HD camera 100 with the equipment can be simplified.

According to the method of reading the luminance information (Y) as stated above, the number of pixels at the imaging is curtailed to ½ to realize the band compression, and the respective CCD's can have the information items read from all the pixels of all their lines independently of one another within one frame. In addition, owing to the conversion in which the signal processing circuit 80 changes the time series sequence of the lines and then delivers the resulting output time series as stated above, the reading which corresponds to sequential scanning can apparently be realized for CCD every field, and the reading which corresponds to interlaced scanning can be realized between the adjacent fields. Accordingly, the reading method brings forth the effect that, even when CCD elements having any hithertoknown structure are used as the CCD's 40 and 50, both the sequential scanning and the interlaced scanning can be performed with ease.

By the way, the present invention is not restricted to the aforementioned imaging elements which perform the sequential scanning in pseudo fashion, but it may well employ imaging elements of the real sequential scanning type in which the information items of pixels are read by scanning lines in the regular order of line Nos. 1, 2, 3, 4, 5, . . . , 517 and 518. According to these imaging elements, the signal processing of the signal processing circuit 80 for changing the sequence of the time series in line units is dispensed with, so that the signal processing of the HD camera 100 can be simplified.

On the other hand, according to the method of reading the two sorts of color information (B and R) as stated above, the line-sequential reading in the compressed band can be realized with ease. In addition, owing to the conversion in which the signal processing circuit 80 changes the time base in line units as stated above, the compressed-band signal in which the color information and the luminance information are multiplexed in time division can be produced with ease.

By the way, in the reading of the color information as stated above, the pixels for each of the color signals are thinned out every line, and hence, so-called "subsampling" in the vertical direction takes place. In some cases, therefore, an aliasing disturbance in the vertical direction arises to degrade the quality of the picture. This problem can be solved by eliminating or relieving the influence of the aliasing disturbance in accordance with any of the following reading methods:

The first of the reading methods is one in which the color filter 70 to be mounted on the photosensitive face of the CCD 60 is furnished with an optical filter element of diffraction grating type or quartz birefringence type, or the like, thereby optically limiting the signal band in the vertical direction. Owing to this method, only the color information has its band limited without incurring the band limitation of the luminance information, and only the aliasing disturbance in the vertical direction attendant upon the line-sequential reading can be eliminated without degrading the resolution of the HD camera 100.

The second is a method in which, as the color filter 70 to be mounted on the photosensitive face of the CCD 60, a BR filter having a striped geometry in the vertical ]0 direction is employed instead of the aforementioned BR filter having the striped geometry in the horizontal direction, whereby the color information items are additionally read in two-line units. More concretely, the pixel-sequential color information items of the respective sets of lines; lines L1 and L2, L3 and L4, L5 and L6, . . . , and L517 and L518 are added and read, whereupon the color signals B and R are separated from the obtained color information items and are delivered as the outputs of the HD camera 100.

Owing to the two-line additional reading method, the vertical filter which limits the signal band in the vertical direction before the line-sequential reading brings forth the effect that the aliasing disturbance can be relieved so as to become visually unobtrusive.

Incidentally, the two-line additional reading method may well be applied to the reading of the luminance information Y. In the case where the color information is read through the two-line addition as stated above, the center of gravity of the color information deviates ½ pitch in the vertical direction. Therefore, when the luminance information is also read through the two-line addition, the center of gravity of the luminance information can also be shifted ½ pitch in the vertical direction into perfect agreement with that of the color information, and a good picture quality can be attained by eliminating the aliasing disturbance without any chromatic aberration.

The third is a method in which a chequered BR color filter is mounted on the photosensitive face of the CCD 60 s the color filter 70. As will be described in detail later with reference to FIGS. 8 (a) thru 8 (g), the chequered BR color filter 70 is so constructed that a B filter and an R filter are arranged by alternately interleaving their constituents in pixel units in both the horizontal and vertical directions. Thus, after the two sorts of color information B and R have been read in pixel sequence every line, the color signals B and R are separated and delivered as the outputs of the HD camera 100.

Owing to the method which utilizes the chequered BR color filter, the two-dimensional sampling structure of the filter brings forth the effect that the aliasing disturbance can be relieved in both the horizontal and vertical directions so as to become even less obtrusive visually.

The above embodiment has been explained as to the case where the two sorts of color information B and R each amounting to 200,000 pixels are read or fetched from the CCD 60 in only the first field per frame of the picture. In order to double the number of read color information items, however, the HD camera 100 may well be constructed as follows: The two-dimensional space is imaged twice per frame T by the CCD 60. In the first time period of T/2. as indicated in FIG. 4 (c), all the pixels (400,000 pixels) of the first field as indicated by the solid lines in FIG. 3(a) are read, and they are delivered as the color information PB and PR Of the first field as indicated in FIG. 4(f) by way of example. Also in the next time period of T/2. , all the pixels (400,000 pixels) of the color information B and R of the same field as indicated by the solid lines are read as the color information B and R of the second field, and they are delivered as the color information PB' and PR' of the second field as indicated in FIG. 4(f) by way of example. According to this reading method, the number of read color information items can be easily increased double without any additional imaging element, so that a great economical effect is attained.

Referring now to FIG. 2, the HD still camera includes an HD still picture recording unit or module 200a by which the video signal delivered from the HD camera 100 shown in FIG. 1 is recorded on a record medium 300a with one frame or one field thereof as a unit. It also includes an HD still picture playback unit or module 400a which plays back the still-picture video signal recorded on the record medium 30a.

The HD camera unit 100 shown in FIG. 1 and the HD still picture recording unit 200a shown in FIG. 2 are coupled by a mechanical detachable structure. The HD still camera for recording on the record medium 300a the still picture taken by the HD camera 100 is constructed in the state in which the two units 100 and 200a are connected. In the ensuing description, the operation of this embodiment will be explained for a case where the stillpicture video signal of one frame or one field is magneto-optically recorded using a magneto-optic disk as the record medium 300a by way of example.

The still-picture video signal of one frame which is delivered from the terminal 90 of the HD camera 100, is the time-division multiplexing signal of single channel in the form shown in FIG. 4(d) or in FIGS. 4(e) and 4(f) as stated before. This still-picture video signal denoted by symbol Va in FIG. 2 is supplied to a record signal processing circuit 210a through a terminal 230a, and is converted into a digital signal of PCM (pulse-code modulation) form through proper processing. More concretely, the video signal Va is converted into a digital signal of 8[bits] in units of the pixels imaged by the HD camera 100. Accordingly, when the embodiment is conformed to the signal form shown in FIGS. 4 (e) and 4 (f), the luminance information Y has an information content of 800,000 pixels × 8[bits](=0.8[MB]:1[B](byte) being equal to 8 [bits]) per frame, and the color information B has an information content of 400,000 pixels × 8-[bits](=0.4[MB]), while the color information R similarly has an information content of 400,000 pixels x 8[bits](=0.4[MB]). Thus, the information contents of all the above sorts of information Y, B and R total 1.6 [MB] per frame or 0.8[MB] per field. Redundant codes for the digital recording, such as synchronizing information and an error correction code, are further added to the aforementioned sorts of information. Finally, when a redundancy of about 13 [%]is set by way of example, a PCM signal which has an information content of 1.8 [MB] (about 14 [Mbits]) per frame or 0.9 [MB](about 7 [Mbits]) per field is delivered from the record signal processing circuit 210a.

On the other hand, when the signal form shown in FIG. 4 (d) is conformed to, the total amount of the two sorts of color information B and R decreases about 0.4 [MB] compared with that in the case of the signal form shown in FIGS. 4(e) and 4 (f). Therefore, a PCM signal which is delivered from the record signal processing circuit 210a has a total information content of 1.2 [MB] per frame or 0.6 [MB] per field.

The PCM signal from the record signal processing circuit 210a is digitally recorded as, for example, a single channel on the disk 300a through a digital recording circuit 220a. Assuming here that the recording rate of the PCM signal on the disk 300a is 14 [Mbps], the still picture of one frame as mentioned above can be recorded in about one [second], or a still picture of one field can be recorded in about 0.5 [second]. In addition, when a diskette of 2.5 inch size capable of recording 180 [MB] is employed as the disk 300a by way of example, about 100 still pictures of one frame as mentioned above can be recorded, or about 200 still pictures of one field can be zecorded being double in number. This makes it possible to supply new media in each of which the still pictures of high definition can be digitally recorded at a high picture quality and in a large storage capacity on the diskette.

Incidentally, either the first record mode in which the video signal from the HD camera 100 is recorded in single-frame units or the second record mode in which it is recorded in single-field units is selected by the record signal processing circuit 210a so as to properly process the video signal. In the case where the second record mode has been selected, the signal of either the first field or the second field shown in FIG. 4(e) is automatically selected and recorded. Besides, a mode discrimination signal for discriminating whether the video signal of the still picture has been recorded in the first record mode or in the second record mode is recorded along with the video signal in, for example, a predetermined blanking time period in which the video information of the still picture is not contained.

Here, the imaging time period T per frame (T/2 per field) in the HD camera 100 is set at will. When the time period T is set short, color high-speed photography is possible, and when the time period T is set long, color high-sensitivity photography with an increased exposure time is possible. Further, when only the optical images formed on the photosensitive faces of the CCD's 40 and 50 are detected, black-and-white photography which includes black-and-white high-speed photography and black-and-white high-sensitivity photography, etc. can be readily performed. Thus, the HD camera 100 can cope with various aspects of photography.

Moreover, when the first record mode mentioned above is assumed as a one-time or standard record mode of high picture quality, a double record mode capable of doubling the number of still pictures to-be-recorded can be simply realized by the second record mode. This brings forth the economical effect that the running costs of the record media can be curtailed.

By the way, the signal processing circuit 80 of the HD camera unit 100 can directly produce a digital signal of, for example, bit stream form in which a preset appropriate number of bits are allotted to each of the imaged pixels beforehand. In a case where the signal processing circuit 80 producing such a digital signal is connected with the HD still picture recording unit 200a, the processing of the pulse code modulation in the record signal processing circuit 210a is dispensed with, and the redundant codes are merely affixed.

Subsequently, in the HD still picture playback unit 400a shown in FIG. 2, the video signal of the still picture digitally recorded on the disk 300a is played back through a digital playback circuit 410a, the output of which is delivered to a playback signal processing circuit 420a.

In the playback signal processing circuit 420a, the color signals PB and PR and the luminance signal Y subjected to the line sequencing and the time-division multiplexing are separated from the still-picture video signal (shown in FIGS. 4(e) and 4(f)) played back, and the time base of the signals is changed in line units. Further, the luminance signal Y having undergone the curtailment in the number of pixels has pixels interpolated. Thus, as shown in FIG. 4(g), the luminance signal Y which is iterated at a field cycle To is restored (in the order of the luminance signal components Y1, Y2, Y3, ..., and Y518 in the first field, and in the order of the luminance signal components Y1', Y2', Y3', ... and Y518' in the second field) The restored luminance signal Y is delivered to a terminal 430a. Also, the color signals PB and PR having undergone the line sequencing have lines interpolated. Thus, as shown in FIG. 4 (h) and FIG. 4 (i), the two color signals PB and PR which develop simultaneously and each of which is iterated at the field cycle To are respectively restored (in the order of the color signal components PB1, PB2, PB3, ..., and PB518, and PR1, PR2, PR3, ..., and PR518 in the first field, and in the order of the color signal components PB1', PB2', PB3', ... and PB518', and PR1', PR2', PR3', ..., and PR518' in the second field). The restored color signals PB and PR are respectively delivered to terminals 440a and 450a.

By the way, in a case where the output video signals are fed to and displayed by a high-definition television receiver, not shown, they are converted into signals in a form conforming to the television system of the television receiver, by the playback signal processing circuit 420a, and the resulting signals are respectively delivered to the corresponding terminals 430a, 440a and 450a.

Mentioned as the concrete example of the high-definition television system is "Hi-vision" which has 1125 scanning lines, a field frequency of 60 [Hz], a frame frequency of 30 [Hz] and an aspect ratio of 16:9. Herein, when the first record mode stated above has been discriminated by the playback signal processing circuit 420a, the field cycle To is set so as to equalize to 1/60. Besides, the video information (the luminance information Y and the two sorts of color information PB and PR), which has been imaged by the HD camera 100 and which has been recorded on and played back from the disk 300a, has 1036 effective scanning lines per frame (518 lines in the first field, and 518 lines in the second field), and a blanking signal for 89 lines is affixed to the video information. Thus, the video information is converted into video signals which have 1125 lines in total and which are interlaced at 2:1. The video signals are externally fed from the terminals 430a, 440a and 450a along with predetermined synchronizing information, respectively.

In the case of this first playback mode, in the playback signal processing circuit 420a, the pixels of the luminance information Y as indicated by the marks "×" on the solid lines and broken lines in FIG. 3(a) are interpolated by the adjacent pixels indicated by the marks "o" or "●", and all of the 1,600,000 pixels are restored per frame. Consequently the maximum resolution which corresponds to 800 pixels in the horizontal direction and 1036 lines in the vertical direction can be attained for the luminance information Y. Incidentally, the horizontal resolution of the HD still camera can be maximized when the pixel interpolation is performed by an arithmetic mean interpolation method in which the pixels of the marks "x" on each line are interpolated by adding and averaging the pixels of the upper and lower lines adjacent to the pertinent line. That is, the pixel of the mark "x" on any of the solid lines (in the first field) is interpolated using a value which is obtained by adding and averaging the pixels of the marks "●" on the upper and lower broken lines (in the second field), while the pixel of the mark "x" on any of the broken lines (in the second field) is interpolated using a value which is obtained by adding and averaging the pixels of the marks "o" on the upper and lower solid lines (in the first field).

Also, the vertical resolution of the HD still camera can be maximized by an arithmetic mean interpolation method in which the pixels of the marks "x" on each line are interpolated by adding and averaging the right and left pixels adjacent to the pertinent pixels. That is, the pixel of the mark "x" on any of the solid lines (in the first field) is interpolated using a value which is obtained by adding and averaging the right and left pixels of the marks "o" on the same solid line (in the first field) (alternatively, using the value of either of the right and left pixels of the marks "o"), while the pixel of the mark "x"on any of the broken lines (in the second field) is interpolated using a value which is obtained by adding and averaging the right and left pixels of the marks "●" on the same broken line (in the second field) (alternatively, using the value of either of the right and left pixels of the marks "●").

Alternatively, the pixel of the mark "x" on each line may well be interpolated using a value which is obtained by adding and averaging the four pixels; the upper, lower, right and left pixels adjacent to the pertinent pixel.

In the first playback mode stated above, the color signals PB and PR having undergone the line sequencing are submitted to the following processing for converting them into the simultaneous signals as shown in FIGS. 4 (h) and 4(i):

For the line-sequential color signal PB2n−1 which is played back as the color information of the odd-numbered line in each field, a signal obtained by adding and averaging the signals of the pertinent line L2n−1 and the adjacent line L2n+1 (alternatively, the signal of either of the two lines) is interpolated and output as the color signal PB2n Of the even-numbered line.

In addition, for the line-sequential color signal PR2n which is played back as the color information of the even-numbered line, a signal obtained by adding and averaging the signals of the pertinent line L2n and the adjacent line L2n+2 (alternatively, the signal of either of the two lines) is interpolated and delivered as the color signal PR2n+1 Of the odd-numbered line.

Next, when the second record mode stated before has been discriminated by the playback signal processing circuit 420a, the field cycle To is set so as to equalize to 1/60. Besides, a blanking signal for 44 lines (or 45 lines) is affixed to the video information (the luminance information Y and the two sorts of color information PB and PR), which has been recorded on and played back from the disk 300a and which has 518 effective scanning lines per field, every field cycle To. Thus, the video information is converted into video signals which have 562 lines (or 563 lines) per field and which are held non-interlaced at 1:1 The video signals are externally fed from the terminals 430a, 440a and 450a along with predetermined synchronizing information, respectively.

In the case of this second playback mode, the horizontal resolution of the HD still camera can be enhanced in such a way that each of the pixels of the marks "x" on any line is interpolated using a value obtained by adding and averaging the right and left pixels adjacent to the pertinent pixel (alternatively, using the value of either of the right and left pixels), every field.

Further, in the case of the second playback mode, the 1:1 non-interlaced output signals may well be replaced with signals which are interlaced at 2:1 and which are output along with predetermined synchronizing information. More specifically, the 2:1 interlaced signals converted from the video information are produced in such a way that a blanking signal for 44.5 lines is affixed to the video information of the first field having 518 effective scanning lines, every field cycle To, whereby they come to have 562.5 lines per field, namely, 1125 lines per frame. According to this method in which the video information is converted into the 2:1 interlaced signals as the output signals, a scanning line disturbance can be made much less than in the case of the 1:1 non-interlaced display, so that a high picture quality of enhanced texture giving an impression of transparency can be attained.

Still further, the signals of the second field to be interlaced with the first field may well be generated by a method in which the signals of the first field left intact are generated for interpolation (that is, a method in which the signal components of the lines L1, L2, L3, . . . , and L518 of the first field are directly delivered as those of the lines L1', L2', L3', . . . , and L518' of the second field, respectively). Alternatively, it is allowed to employ a method in which signals (arithmetic mean signal values) obtained by adding and averaging the signal components of every two lines adjacent to each other in the first field are delivered as the signals of the second field (that is, a method in which signal values obtained by adding and averaging the signal components of the adjacent lines L1 and L2, L2 and L3, L3 and L4, . . . , and L517 and L518 of the first field are delivered as the signal components of the lines L1', L2', L3', . . . and L518' of the second field, respectively). According to the latter method, flickering which develops at the stage of the interlaced scanning conversion due to vertical filtering can be reduced, so that a visually stable picture can be obtained.

In the above, there have been described the cases where the video output signals in the form conforming to the high-definition television system ("Hi-vision") are delivered to the terminals 430a, 440a and 450a. As another aspect of playback, the video signal of the high-definition television system produced by each of the playback modes stated above may well be converted into a video signal in a form conforming to the current television system (such as NTSC system), by changing the number of scanning lines and the aspect ratio, so as to deliver the resulting output signals to the terminals 430a, 440a and 450a or to terminals provided separately.

Next, numeral 500 in FIG. 2 denotes a signal conversion unit or module which converts the number of scanning lines and the aspect ratio of an external video signal (for example, the video signal of the conventional television system) entering a terminal 510. More concretely, the terminal 510 is fed with that video signal of the NTSC system which has 525 scanning lines, a field frequency of 59.94 [Hz], a frame frequency of 29.97 [Hz], an interlacing ratio of 2:1, and an aspect ratio of 4:3. The video signal of the NTSC system is converted into a 1:1 non-interlaced signal having 525 scanning lines and an aspect ratio of 16:9, and seven of the scanning lines corresponding to vertical blanking time intervals are removed. Thus, a signal V' which has the same number of scanning lines, 518 lines, as that of the video signal Va delivered from the HD camera 100 (the time-division multiplexing signal shown in FIG. 4(d) or in FIGS. 4(e) and 4(f)) and in which the luminance signal Y and the two color signals PB, PR are subjected to time-division multiplexing in line sequence is generated and output per field.

The converted video signal V' is fed to the record signal processing circuit 210a through a terminal 240a as the record video signal of the second mode, and it is processed in the same manner as in the second record mode of the video signal Va delivered from the HD camera 100. The processed signal is recorded on the disk 300a through the digital recording circuit 220a. In the case where the recording of the video signal V' delivered from the terminal 240a has been designated by the record signal processing circuit 210a, the second record mode in which the video signal V' is recorded in field units is set. Accordingly, T'/2=1/59.94 is set as the time period for recording one field, and the signal of any desired field to be recorded is extracted from the video signal V' and is submitted to the same record processing as stated before. The resulting signal is recorded on the disk 300a along with the mode discrimination signal which designates the second record mode.

In playing back the video signal V' recorded in the second mode, the playback signal processing circuit 420a executes playback processing in field units in the same manner as in the second playback mode stated before. Thus, the output video signals of the high-definition television system ("Hi-vision") having the 1125 scanning lines, the field frequency of 60 [Hz], the frame frequency of 30 [Hz] and the aspect ratio of 16:9 are delivered from the terminals 430a, 440a and 450a, and the picture of the output video signals is displayed by a television receiver. In this manner, according to the present invention, even signals which differ in the number of scanning lines, the aspect ratio, the field frequency, etc. can be recorded on record media in the identical format, and a wide picture can be displayed on a television receiver in a high-definition mode in any case, so that new additional values having hitherto been unattainable can be realized.

The still picture playback unit 400a is separately provided with a dubbing output terminal 460a through which the playback video signal fetched from the disk 300a is delivered as a digital signal, thereby making it possible to digitally copy or edit the video signal when this unit 400a is interconnected with the still picture recording unit 200a. The output digital signal played back by the playback signal processing circuit 420a is fed through the dubbing output terminal 460a to the dubbing input terminal. 250a of the still picture recording unit 200a and then to the record signal processing circuit 210a, along with the mode discrimination signal thereof. Subsequently, in accordance with the first mode or the second mode discriminated, the fed digital signal is submitted to record processing in the same manner as stated before. Thereafter, the processed signal is digitally recorded on the disk 300a through the digital recording circuit 220a, along with the mode discrimination signal thereof.

In the above case of digital copying or editing, the playback digital signal fetched from the disk 300a has any error corrected in the playback signal processing circuit 420a by the use of the error correction code contained therein. Thereafter, the corrected digital signal is converted into an output signal in the same form as in the case of recording the digital signal under the condition of the curtailed number of pixels, without performing the pixel interpolation.

Incidentally, the terminal 460a can be employed as the output terminal of a transmission digital signal for transmitting a picture by the use of a predetermined transmission line such as a telephone line.

Also, the still picture playback unit 400a is separately provided with a copy output terminal 470a0 through which the playback video signal fetched from the disk 300a is delivered as a digital signal of, for example, bit stream form, whereby a hard copy can be made when this unit 400a is interconnected with a high-definition still picture printer unit or module not shown.

By the way, the embodiment shown in FIG. 1 has mentioned the example in which the imaging element having 400,000 pixels is used as each of the CCD's 40, 50 and 60. However, the present invention is not restricted to the example, but the number of pixels can be selected at will.

Besides, the embodiment shown in FIG. 1 has been described as to the case where the CCD's 40 and 50 are furnished with no color filter and have the luminance information read or derived therefrom, but the present invention is not restricted to the exemplified case. Although not illustrated, the HD camera 100 may well be constructed as follows: The G filters for deriving the green information G as the first color information C1 as stated before are mounted on the photosensitive faces of the CCD's 40 and 50. Thus, not only the blue information B and the red information R from the CCD 60, but also the green information G from the CCD's 40 and 50 is obtained by the imaging. The three sorts of color information in the three primary colors are submitted to a predetermined matrix operation in the signal processing circuit 80 so as to generate the luminance information Y and the two sorts of color information PB and PR. The construction brings forth the same effects.

Pixel interpolations required for the matrix operation of the signal processing circuit 80 in this case will be explained in connection with an embodiment shown in FIGS. 5(a) thru 5(f).

In order to produce the luminance information Y from the information of the three primary colors G, B and R through the matrix operation, the numbers of pixels of the three sorts of color information need to be equalized to one another. The blue information B in the number of 200,000 pixels (pixels of marks "o" indicated in FIG. 5 (a)) and the red information R in the same number of 200,000 pixels (pixels of marks "●" indicated in FIG. 5 (d)), which are derived from the CCD 60 per frame, have pixels interpolated, respectively, relative to the green information G of 800,000 pixels which are derived from the CCD's 40 and 50 per frame (and which corresponds to the pixels of the marks "o" and "●" indicated in FIG. 3(a)). In this way, both the sorts of color information b and r are converted into signals each having 800,000 pixels (as shown in FIGS. 5(c) and 5(f), respectively).

Figure 5A:
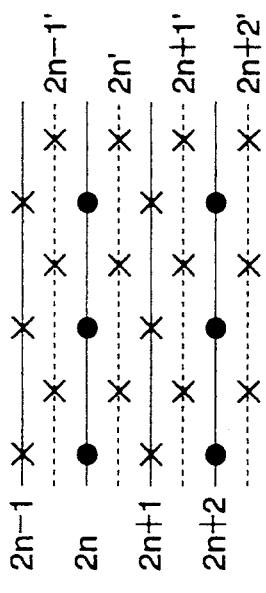
FIGS. 5(a) thru 5(f) are explanatory diagrams showing the spatial sampling points and pixel interpolations of a two-dimensional picture which is taken on the basis of another embodiment of the present invention.
Figure 5B:
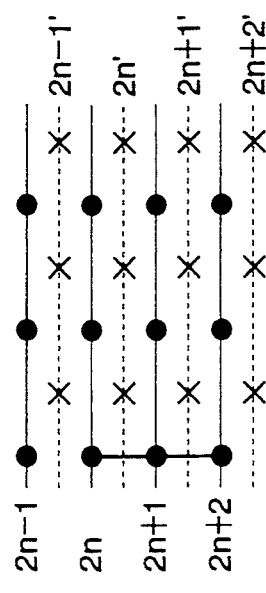
Figure 5C:
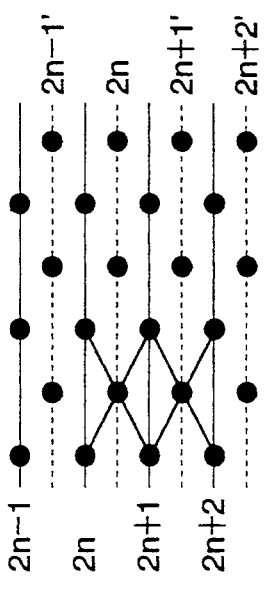

More concretely, on the basis of the blue information B of the 200,000 pixels derived from the CCD 60 (as shown in FIG. 5 (a)), values (arithmetic mean values) obtained by adding and averaging the pixels of the odd-numbered lines (2n−1) and (2n+1) of the first field are interpolated as the pixels of the even-numbered line (2n) of the first field (as shown in FIG. 5(b)). Further, values obtained by adding and averaging the respective pairs of adjacent pixels on the even-numbered line (2n) and the respective pairs of adjacent pixels on the odd-numbered line (2n−1) as have resulted from the above interpolation are interpolated as the pixels of the odd-numbered line (2n−1)' of the second field (as shown in FIG. 5 (c)). Besides, values obtained by adding and averaging the respective pairs of adjacent pixels on the even-numbered line (2n) and the respective pairs of adjacent pixels on the odd-numbered line (2n+1) are interpolated as the pixels of the even-numbered line (2n)' of the second field (as shown in FIG. 5(c)). Thus, the 800,000 pixels in total are restored per frame.

Figure 5D:
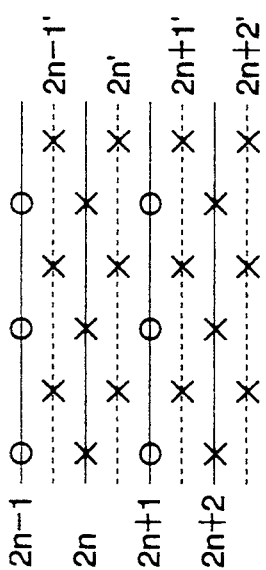
Figure 5E:
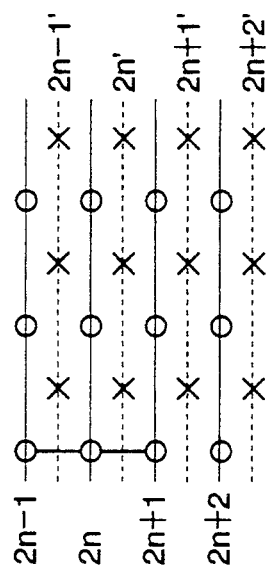
Figure 5F:
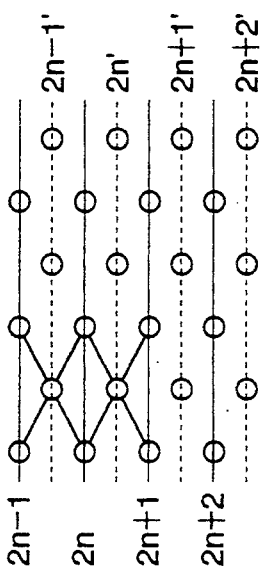

Likewise, on the basis of the red information R of the 200,000 pixels derived from the CCD 60 (as shown in FIG. 5(d)), values (arithmetic mean values) obtained by adding and averaging the pixels of the even-numbered lines (2n) and (2n+2) of the first field are interpolated as the pixels of the odd-numbered line (2n+1) of the first field (as shown in FIG. 5(e)). Further, values obtained by adding and averaging the respective pairs of adjacent pixels on the odd-numbered line (2n+1) and the respective pairs of adjacent pixels on the even-numbered line (2n) as have resulted from the above interpolation are interpolated as the pixels of the even-numbered line (2n)' of the second field (as shown in FIG. 5 (f)). Besides, values obtained by adding and averaging the respective pairs of adjacent pixels on the odd-numbered line (2n+1) and the respective pairs of adjacent pixels on the even-numbered line (2n+2) are interpolated as the pixels of the odd-numbered line (2n+1)' of the second field (as shown in FIG. 5(f)). Thus, the 800,000 pixels in total are restored per frame.

The green information G read in the total number of 800,000 pixels, and the blue information B and red information R restored in the total numbers of 800,000 pixels by the above pixel interpolations, are used for executing the matrix operation with predetermined coefficients, thereby generating the desired luminance information Y which has the total number of 800,000 pixels per frame. The luminance information Y obtained through the pixel interpolations and the matrix operation stated above can be brought into approximate agreement with the luminance information Y obtained by the foregoing embodiment shown in FIG. 1. Since the luminance information is produced from the three sorts of information in the three primary colors without the degradation of the resolution, imaging of favorable color balance can be achieved even in case of a change in the brightness of a subject.

Although, in the foregoing embodiment, is has been assumed that the CCD's 40, 50 and 60 have the imaging regions at the aspect ratio of 16:9, the present invention is not restricted to the assumed case. In a case where imaging elements having any desired aspect ratio, for example, the same aspect ratio of 4:3 as in the conventional television system are used as the CCD's 40, 50 and 60, an anamorphic lens which reduces an optical image of 16:9 to 4:3 in the horizontal direction is employed instead of the lens 10 or is disposed in front of the lens 10, whereby wide and high-definition photography at the aspect ratio of 16:9 can be, in effect, realized. Such a contrivance shall not depart from the subject matter of the present invention.

The form of the output video signal Va from the HD camera unit 100 is not restricted to the single channel, either. By way of example, the read outputs of the respective CCD's 40, 50 and 60 having the curtailed number of pixels as shown in FIGS. 4 (a), 4 (b) and 4 (c) may well be directly delivered. Alternatively, signals in three channels may well be delivered in such a way that the read outputs of the respective CCD's 40, 50 and 60 having the curtailed number of pixels are processed similarly to the pixel interpolation in the playback signal processing circuit 420a, thereby obtaining the luminance signal Y and the color signals PB, PR which have the restored pixels, or that the luminance signal Y and the color signals PB, PR mentioned above are further processed through the predetermined matrix operation, thereby obtaining the signals G, B and R of the three primary colors. Such a contrivance shall fall within the category of the present invention.

In addition, the blur of the picture attributed to the unintentional movement of the HD camera 100 can be corrected without degrading the picture quality in the following way: A variable-vertical-angle prism having heretofore been known, not shown, is disposed before or behind the lens 10. The blur of the taken picture is detected by the signal processing circuit 80, and the variable-vertical-angle prism is perturbed on the basis of a detection signal obtained. Thus, optic axes to be formed on the CCD's 40, 50 and 60 are changed.

Besides, when a semiconductor memory, such as an IC card or flash memory, is used as the record medium 300a, the output from the record signal processing circuit 210a or the video signal Va from the HD camera unit 100 can be directly written into the semiconductor memory without employing any special recording means such as the digital recording circuit 220a.

Incidentally, when means for playing back the signal recorded in the aforementioned semiconductor memory and means for recording the playback output on, for example, the optical disk are both disposed in the HD still picture playback unit 400a, a new filing system in which still pictures each having been recorded in the semiconductor memory with a small capacity are successively edited and filed in the optical disk of large capacity can be provided, and new values which are not attainable with a conventional album can be added.

The signal form of the video signal to be recorded on the record medium 300a is not restricted to the time-division multiplexing signal as mentioned in the foregoing embodiment, and the single recording channel is not restrictive, either. In general, the video signal can be recorded in any desired signal form and in any desired number of channels. By way of example, the video signal may well be recorded as follows: In the signal processing circuit 80 of the HD camera 100, the read outputs in pixel units from the respective CCD's 40, 50 and 60 as shown in FIGS. 4 (a) , 4 (b) and 4 (c) are converted into digital signals by allotting a predetermined number of bits sequentially in the pixel units. Thus, the signals of, e. g., three channels are delivered from the signal processing circuit 80. The digital signals of the three channels are submitted to the record processing every channel in the record signal processing circuit 210a. The processed signals are recorded on the record medium 300a in the three channels by the digital recording circuit 220a.

Further, the foregoing embodiment has mentioned the case where the record signal processing circuit 210a converts the output video signal Va of the HD camera 100 into the digital signal by allotting 8 [bits] to each of the imaged pixels of the luminance signal and the color signals. However, the present invention is not restricted to the above number of bits, but the number of bits to be allotted is set at will. By way of example, when the number of bits to be allotted is curtailed to $\frac{1}{2}$ or less by the use of a bit compression technique having heretofore been known, such as DPCM (differential pulse code modulation) or DCT (discrete cosine transform), the number of still pictures to be recorded on the record medium 300a can be increased to double or more. This can bring forth the great economical effects of lowering of the running cost of the record medium 300a, decrease in the required storage capacity of the semiconductor memory, etc.

Regarding the bit compression, the HD still camera may well be constructed as follows: As the third record mode, the record video signal whose information content has been reduced by the bit compression is recorded on the record medium 300a along with a mode discrimination signal for identifying this mode. In playing back the recorded video signal, the playback signal processing circuit 420a identifies the third record mode on the basis of the mode discrimination signal, and it restores the information content reduced by the bit compression and also restores the lacking pixels as explained before. Thus, the output video signals with all the pixels restored are delivered to the terminals 430a, 440a and 450a.

Now, another embodiment of a method of outputting a high-definition video signal obtained by the imaging of the HD camera unit or module 100 will be described with reference to timing charts of FIGS. 6(a) thru 6(e).

In the embodiment illustrated in FIGS. 4(a) thru 4(i), any of the CCD's 40, 50 and 60 images the pixels in units of the scanning cycle of one frame. In contrast, in the embodiment illustrated in FIGS. 6(a) thru 6(e), each CCD images the pixels in units of the scanning cycle of one field.

More specifically, in the time period of T/4 which is the first half of the first field, the luminance information components Y1, Y3, Y5, . . . , and Y517 of the odd-numbered lines are read or derived from the CCD 40 as shown in FIG. 6(a), while the blue information components B1, B3, B5, . . . , and B517 of the odd-numbered lines are read or derived from the CCD 60 as shown in FIG. 6(c).

In the subsequent time period of T/4 which is the latter half of the first field, the luminance information components Y2, Y4, Y6, . . . , and Y518 of the even-numbered lines are read from the CCD 40 as shown in FIG. 6(a), while the red information components R2, R4, R6, . . . , and R518 of the even-numbered lines are read from the CCD 60 as shown in FIG. 6(c). Besides, in the subsequent time period of T/4 which is the first half of the second field, the luminance information components Y1', Y3', Y5', and Y517' of the odd-numbered lines are read from the CCD 50 as shown in FIG. 6(b), while the blue information components B1, B3, B5, . . . , and B517 of the odd-numbered lines are read from the CCD 60 as shown in FIG. 6 (c) . Further, in the subsequent time period of T/4 which is the latter half of the second field, the luminance information components Y2′, Y4′, Y6′, . . . , and Y518′ of the even-numbered lines are read from the CCD 50 as shown in FIG. 6(b), while the red information components R2, R4, R6, . . . , and R518 of the even-numbered lines are read from the CCD 60 as shown in FIG. 6(c).

Regarding the read outputs of the individual CCD's as stated above, the output time series sequence of line units 5 is changed by the signal processing circuit 80 as shown in FIG. 6(d). Letting symbol T′ denote the basic cycle of one frame of the video signal to-be-delivered, signal components are output in the sequence of the lines L1, L2, L3, L4, . . . , L517 and L518 in that time period of the first field which is the first time period of T′/2, and signal components are output in the sequence of the lines L1′, L2′, L3′, L4′, . . . , L517′ and L518′ in that time period of the second field which is the next time period of T′/2. Regarding the signal components, as shown in FIG. 6(e), a time base in line units is changed by the signal processing circuit 80 so as to convert the read information into the signal of single channel in which the luminance signal Y and the color signals PB, PR are subjected to time-division multiplexing in line units. The single-channel signal is output from the HD camera 100.

The embodiment shown in FIG. 2 has exemplified the application of the HD camera unit 100 to the still picture recording/playback apparatus. Needless to say, however, the present invention is not restricted to the example, but it is also applicable to an apparatus for recording and playing back a moving picture, such as video tape recorder (VTR). In the case of connecting the HD camera unit 100 of the embodiment to the VTR so as to record and play back the moving picture, it may be constructed as follows by way of example: The imaging cycle T of one frame indicated in FIGS. 4 (a), 4 (b) and 4 (c) or in FIGS. 6 (a), 6 (b) and 6 (c) is set at, for example, the same value as the frame cycle (1/30 [second]) or the field cycle (1/60 [second]) of the high-definition television system ("Hi-vision"). Under this condition, a subject is continuously imaged in frame or field units. Thus, successive moving-picture video signals Va which have, for example, the field cycle of T′/2 (=1/60 [second]) in the same form as that of the time-division multiplexing signal shown in FIGS. 4 (d), 4 (e) and 4(f) or in FIGS. 6(d) and 6(e) are generated by the signal processing circuit 80 of the HD camera unit 100. The moving-picture video signals Va are recorded on a magnetic tape, not shown, and the recorded signals are played back from the magnetic tape.

Figure 7:
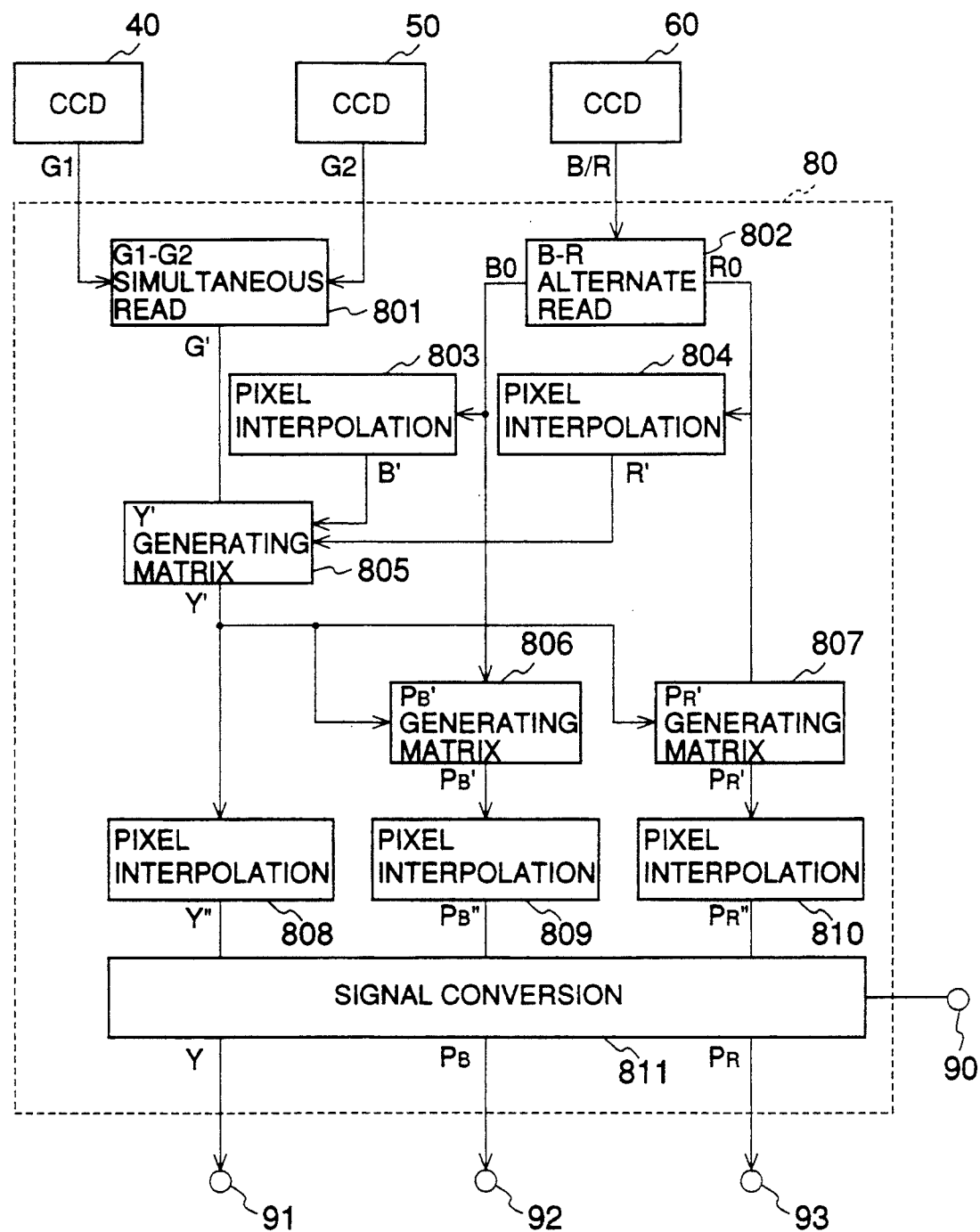
FIG. 7 is a block diagram showing signal processing which is based on another embodiment of the present invention.

Now, video signal processing in another embodiment of the present invention will be described with reference to a block diagram of the signal processing circuit 80 shown in FIG. 7. Here in this embodiment, imaging elements of sequential scanning type are employed as the CCD's 40, 50 and 60 shown in FIG. 1, the CCD's 40 and 50 are furnished with G (green) filters as color filters, and the CCD 60 is furnished with the chequered BR (blue and red) filter mentioned before. In addition, the operation of a color imaging system in the case of employing the chequered BR filter will be explained with reference to FIGS. 8 (a) thru 8(g).

First, the CCD's 40 and 50 image a subject in sequential scanning fashion simultaneously by the use of two light beams. Thus, green information G1 (pixels of the marks "o" in the first field indicated by the solid lines in FIGS. 3(a) and 3 (b) ) and green information G2 (pixels of the marks "●" in the second field indicated by the broken lines) are read or derived from the respective elements 40 and 50. A read circuit 801 supplied with the green information G1 and G2 produces a green signal G′ of two simultaneous fields. As shown in FIG. 3(a), the signal G′ of the two simultaneous fields has the pixel array in which the pixels are arranged in quincunxes when viewed in the two-dimensional space.

Figure 8A:
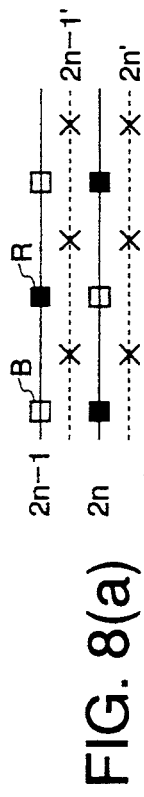
FIGS. 8(a) thru 8(g) are explanatory diagrams showing the spatial sampling points and pixel interpolations of a two-dimensional picture which is taken by the embodiment depicted in FIG. 7.
Figure 8B:
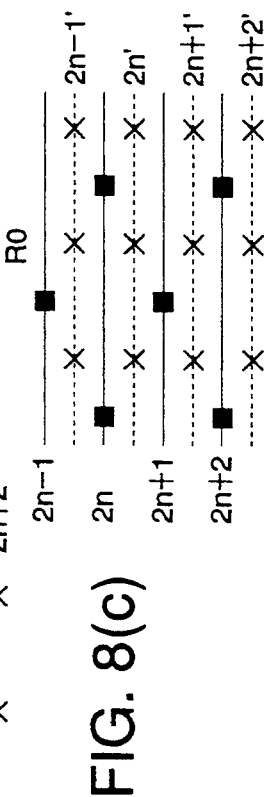
Figure 8C:
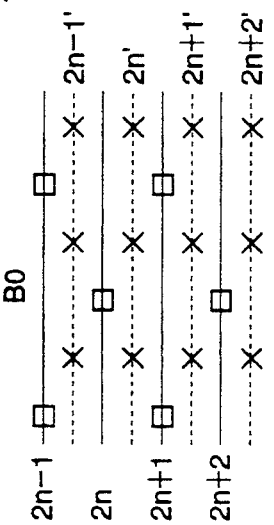
Figure 8D:
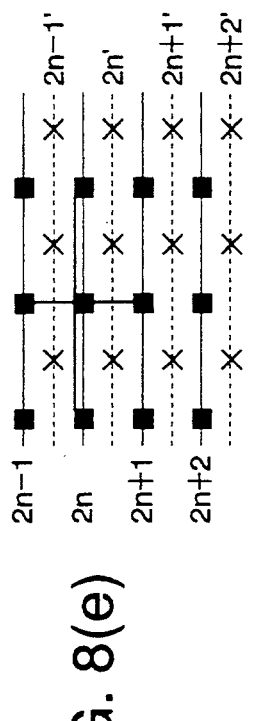
Figure 8E:
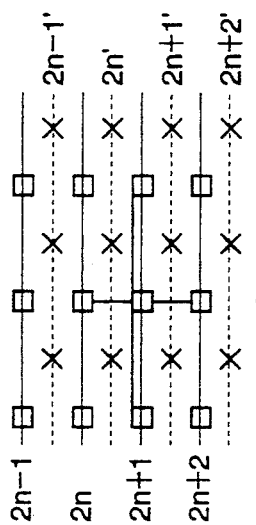
Figure 8F:
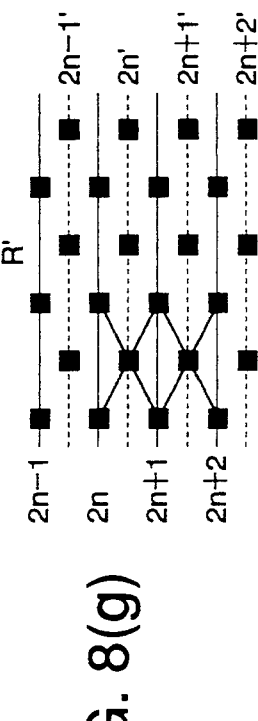
Figure 8G:
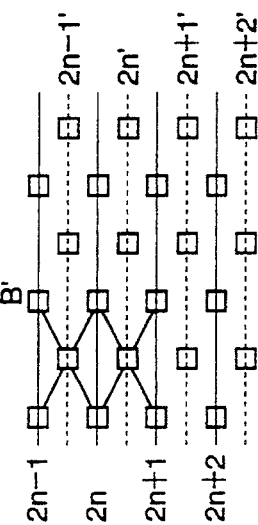

Further, the CCD 60 images the subject in sequential scanning fashion through the BR filter in which B filter elements and R filter elements are alternately arranged in a chequered pattern, and blue information (pixels of marks "□") and red information (pixels of marks "■") are read or derived from the CCD 60 alternately in pixel sequence as shown in FIG. 8(a). A read circuit 802 supplied with the blue information and the red information separates them to deliver a blue signal B0 and a red signal R0 as shown in FIG. 8(b) and FIG. 8(c), respectively. The separated signals B0 and R0 are respectively submitted to pixel interpolations by pixel interpolation circuits 803 and 804, and are respectively delivered as signals B′ and R′. More concretely, as shown in FIGS. 8(d) and 8(e), those pixels of the separated signals B0 and R0 which have not been imaged in the first field indicated by solid lines are respectively interpolated on the basis of surrounding adjacent pixels, for example, with values (arithmetic mean values) obtained by adding and averaging upper, lower, right and left adjacent pixels within the identical field as indicated by lines drawn in the figures. Besides, as shown in FIGS. 8(f) and 8(g), those pixels of the separated signals B0 and R0 which have not been imaged in the second field indicated by broken lines are respectively interpolated on the basis of the pixels of the first field, for example, with values (arithmetic mean values) obtained by adding and averaging the right and left adjacent pixels of the upper and lower lines as indicated by lines drawn in the figures. As seen from FIGS. 8(f) and 8(g), each of the signals B′ and R′ obtained by the above pixel interpolations has the pixel array in which the pixels are arranged in quincunxes when viewed in the two-dimensional space, and which is the same as the pixel array of the signal G′.

The green signal G′ from the circuit 801, the blue signal B′ from the circuit 803 and the red signal R′ from the circuit 804 as stated above are submitted to a matrix operation in a matrix circuit 805, whereby a luminance signal Y′ is generated and delivered. The luminance signal Y′ is submitted to the same pixel interpolation as in the foregoing case shown in FIGS. 3(a) and 3(b), in a pixel interpolation circuit 808, whereby a luminance signal Y″ containing all the pixels is generated. The signal Y″ is further processed properly in a signal conversion circuit 811, and an output luminance signal Y is delivered to a terminal 91.

On the other hand, the blue signal B0 and red signal R0 from the circuit 802 are respectively submitted to matrix operations on the basis of the output luminance signal Y′ of the circuit 805 in matrix circuits 806 and 807, whereby color difference signals PB′ and PR′ are respectively generated and delivered. The matrix operations in the circuits 806 and 807 are respectively executed in units of, at least, the imaged pixels shown in FIGS. 8(b) and 8(c). Accordingly, the method of generating the color difference signals PB′ and PR′ in this embodiment may well be replaced with an unshown method in which these signals PB′ and PR′ are produced from the signal G′ (or G1), signal B0 and signal R0, or in which they are produced from the signal G′(or G1), signal B′ and signal R′. In the aforementioned case where the color difference signals PB' and PR' are generated in the units of only the imaged pixels on the basis of the signals B0 and R0, they are obtained in only the first field indicated by the solid lines. Therefore, the color difference signals PB' and PR' of the second field indicated by the broken lines are respectively interpolated and generated on the basis of those of the first field in pixel interpolation circuits 809 and 810 at stages succeeding the matrix circuits 806 and 807. Besides, in a case where the color difference signals PB' and PR' are generated at all the pixels on the basis of the interpolated signals B', R' and Y' (or G'), the pixel interpolation circuits 809 and 810 are not always necessary. Color difference signals which are generated through the proper pixel interpolations in the circuits 809 and 810 as stated above, are respectively delivered as indicated by symbols PB" and PR". The signals PB" and PR" are further processed properly in the signal conversion circuit 811, and the processed signals are delivered to terminals 92 and 93 as output color difference signals PB and PR, respectively.

In this embodiment, the three CCD's 40, 50 and 60 image the subject simultaneously by means of the sequential scanning as stated above. Owing to the above processing, therefore, the signals of the first field (the field indicated by the solid lines) and the second field (the field indicated by the broken lines) are simultaneously obtained as the luminance signal Y" and the color difference signals PB" and PR" by one time of imaging (by imaging one field). Accordingly, in the case where the signals Y, PB and PR in the same interlaced scanning form as in the conventional television system are to be output on the basis of the signals Y", PB" and PR" of the two simultaneous fields, the signal conversion circuit 811 performs such scanning conversion that the signals of the first field and those of the second field are alternately changed-over in field cycle units so as to be converted into the interlaced signals. If necessary, the signal conversion circuit 811 converts the signals Y", PB" and PR" or the signals Y, PB and PR into the single-channel signal (for example, the signal shown in FIG. 4(f) or FIG. 6(e)) in which these signals are multiplexed in time division, and which is delivered to the terminal 90.

The terminal 90 is usable for the connection of the HD camera 100 with the recording apparatus or the like as exemplified in the foregoing embodiment, whereas the terminals 91, 92 and 93 are usable for the connection thereof with a picture, display apparatus such as a television receiver for monitoring the picture taken by the imaging or an ordinary color television receiver of the high definition type.

Incidentally, in the case where the color difference signals PB and PR are submitted to the line sequencing by the circuit 811 so as to be delivered, for example, in the single channel as the time-division multiplexed signal from the terminal 90, the band of the signal is previously limited in the vertical direction by the circuit 811 in order to eliminate the aliasing disturbance attendant upon the line sequencing operation.

As thus far described, according to the present invention, an imaging device capable of taking a highdefinition picture, the pixels of which are four times or more larger in number than those of a conventional imaging device, and an apparatus capable of recording/playing back (or transmitting) the high-definition picture, can be realized at a comparatively low cost and supplied early in such a way that solid-state imaging elements, which are employed in conventional television cameras etc. and each of which has a comparatively small number of pixels, are used without increasing the number of pixels of each solid-state imaging element.

In particular, when the imaging device is applied to an apparatus for recording and playing back a still picture or a moving picture, a wide picture of high definition can be recorded at a high fidelity and at a high picture quality, and the effective signal band thereof can be reduced to permit the recording of a large information content in the narrow band. Accordingly, the package and assembly of a record medium can be reduced in size. Moreover, various functions such as color photography, black-and-white photography, high-speed photography and high-sensitivity photography can be realized, and digital copy, hard copy, editing, etc. are easy, so that apparatuses with new additional values which have hitherto been unattainable can be provided.

What is claimed is:

1. A high-definition imaging device which images a two-dimensional space that includes, at least, nH spatial sampling points in a horizontal direction and nV spatial sampling points (nV lines) in a vertical direction, totaling nH×nV) spatial sampling points, and which delivers an information signal of a high-definition picture, comprising:

first imaging means including two, first and second two-dimensional solid-state imaging elements, for delivering a first imaging signal, each of said first and second imaging elements having a pixel array which is configured on nH/2 pixels in said horizontal direction and nV/2 pixels (nV/2 lines) in said vertical direction, totaling (nH×Nv)/4 pixels, said first and second imaging elements being arranged such that said first and second imaging elements are offset ½ pixel pitch in said horizontal direction and ½ pixel pitch in said vertical direction from each other, said first imaging signal being delivered on the basis of read outputs from the respective solid-state imaging elements, and containing, at least, one of luminance information and imaging pixel information obtained in relation to first color information, each of said luminance information and said pixel information corresponding to, at most, (nH×nV)/2 pixels per picture plane of either of one field or one frame;

second imaging means including a third two-dimensional solid-state imaging element, for delivering second and third imaging signals, said third imaging element having a pixel array which is configured of the nH/2 pixels in said horizontal direction and the nV/2 pixels (nV/2 lines) in said vertical direction, totaling the (nH×nV)/4 pixels, said second and third imaging signals being delivered on the basis of read outputs from said third solid-state imaging element, and containing, at least, imaging pixel information obtained in relation to second color information and third color information, respectively, each of said second color information and said third color information corresponding to, at most, (nH×nV)/8 pixels per the picture plane of either of the one field or the one frame; and signal output means for generating a predetermined information signal on the basis of said first imaging signal delivered from said first imaging means and said second and third imaging signals delivered from said second imaging means, and for delivering the generated information signal as an output of said high-definition imaging device.

2. A high-definition imaging device as defined in claim 1, wherein said first imaging means includes means for changing a time base of outputs obtained in such a way that said information of said first imaging signal from, the pixel arrays of at least one of said first and second solid-state imaging elements is read every second line in an interlaced scanning form, thereby producing a signal of sequential scanning form, and for delivering the produced signal.

3. A high-definition imaging device as defined in claim 1, wherein said first imaging means includes means for changing a time base of outputs of interlaced scanning form obtained in such a way that said information of said first imaging signal from, the pixel arrays of at least one of said first and second solid-state imaging elements is added in units of two lines, thereby producing a signal of sequential scanning form, and for delivering the produced signal.

4. A high-definition imaging device as defined in claim 1, wherein said first imaging means includes means for reading said information of said first imaging signal from the pixel arrays of at least one of said first and second solid-state imaging elements every line in a sequential scanning form.

5. A high-definition imaging device as defined in claim 1, wherein said second imaging means includes means for permitting said third solid-state imaging element to produce respective items of said imaging pixel information relevant to said second color information and said third color information at alternate pixels within each line.

6. An apparatus for recording high-definition picture information, comprising said high-definition imaging device as defined in claim 1, and further comprising signal generation means for generating a signal of a first mode on the basis of said information signal delivered from said signal output means, and record means for recording the output signal of said signal generation means on a record medium.

7. An apparatus for recording high-definition picture information as defined in claim 6, wherein said signal generation means includes means for generating a signal of a second mode which has an information content reduced to, at most, ½ of that of the first-mode signal, and said record means records at least one of said first-mode signal and said second-mode signal.

8. An apparatus for recording high-definition picture information as defined in claim 6, wherein said signal generation means includes input means for receiving a signal of a second mode, said input means being connected through a connection terminal with a signal conversion unit which converts a predetermined external video signal into said second-mode signal, and said record means records at least one of said first-mode signal and said second-mode signal delivered from said input means.

9. An apparatus for recording high-definition picture information as defined in claim 6, wherein said signal generation means includes means for generating a digital signal in which a predetermined code redundancy is affixed to said information signal delivered from said signal output means, and said record means records said digital signal.

10. An apparatus for playing back high-definition picture information wherein an information signal which is generated on the basis of a first imaging signal and second and third imaging signals and which is recorded on a record medium is played back; the first imaging signal and the second and third imaging signals are respectively produced in such a ways that two, first and second two-dimensional solid-state imaging element, and a third two-dimensional solid-state imaging element image a two-dimensional space which includes, at least, nH spatial sampling points in a horizontal direction and nV spatial sampling points (nV lines) in a vertical direction, totaling (nH×nV) spatial sampling points; each of the first and second imaging elements has a pixel array which is configured of nH/2 pixels in the horizontal direction and nV/2 pixels (nV/2 lines) in the vertical direction totaling (nH×nV)/4 pixels; the first and second imaging elements are arranged in a state in which they are offset ½ pixel pitch in the horizontal direction and ½ pixel pitch in the vertical direction from each other; the first imaging signal is delivered on the basis of read outputs from the first and second solid-state imaging elements, and contains at least one of luminance information and imaging pixel information obtained in relation to first color information, each of the luminance information and the pixel information corresponding to, at most, (nH×nV)/2 pixels per picture plane of either of one field or one frame; the third imaging element has a pixel array which is configured of the nH/2 pixels in the horizontal direction and the nV/2 pixels (nV/2 lines) in the vertical direction , totaling the (nH×nV)/4 pixels; and the second and third imaging signals are delivered on the basis of read outputs from the third solid-state imaging element, and they contain, at least, imaging pixel information obtained in relation to second color information and third color information, respectively, each of the second color information and the third color information corresponding to, at most, (nH×nV)/8 pixels per the picture plane of either of the one field or the one frame; comprising;

playback means for playing back said information signals from said record medium; and signal output means for generating a predetermined video signal on the basis of the playback signal delivered from said playback means, and for delivering the generated video signal as an output of the playback apparatus.

11. An apparatus from playing back high-definition picture information as defined in claim 10, wherein said signal output means includes signal processing means for interpolatively restoring, at least, those pixels of said playback signal of said playback means which correspond to the spatial sampling points omitted from the imaging, thereby playing back said video signal which contains, at least, effective pixel information relevant to said luminance information corresponding to, at most, nH pixels in said horizontal direction and nV pixels (nV lines) in said vertical direction, totaling (nH×nV) pixels per the picture plane of either of the one field or the one frame.

12. An apparatus for playing back high-definition picture information as defined in claim 10, wherein said signal output means includes digital output means for delivering a digital signal based on said playback signal of said playback means, and the output delivered from said digital output means is recorded on a predetermined record medium.

13. A high-definition imaging device which images a two-dimensional space that includes, at least, nH spatial sampling points in a horizontal direction and nV spatial sampling points (nV lines) in a vertical direction, totaling (nH×nV) spatial sampling points, and which delivers an information signal of a high-definition picture, comprising:

first imaging means including two, first and second two-dimensional solid-state imaging elements, for delivering a first imaging signal, each of said first and second imaging elements having a pixel array which is configured of nH/2 pixels in said horizontal direction and nV/2 pixels (nv/2 lines) in said vertical direction, totaling (nH×nV)/4 pixels, said first and second imaging elements being arranged in a state in which they are offset ½ pixel pitch in said horizontal direction and ½ pixel pitch in said vertical direction from each other, said first imaging signal being delivered on the basis of read outputs from the respective solid-state imaging elements, and containing at least one of luminance information and imaging pixel information obtained in relation to first color information, each of said luminance information and said pixel information corresponding to, at most, (nH×nV)/2 pixels per picture plane of either of one field or one frame;

second imaging means including a third two-dimensional solid-state imaging element, for delivering second and third imaging signals, said third imaging element having a pixel array which is configured of the nH/2 pixels in said horizontal direction and the nV/2 pixels (nV/2 lines) in said vertical direction, totaling the (nH×nV)/4 pixels, said second and third imaging signals being delivered on the basis of read outputs from said third solid-state imaging element, and containing, at least, imaging pixel information obtained in relation to second color information and third color information, respectively, each of said second color information and said third color information corresponding to, at most, (nH×nV)/8 pixels per the picture plane of either of the one field or the one frame;

first signal generation means for interpolatively restoring, at least, those pixels of said first imaging signal which have been omitted from the imaging, thereby generating a first information signal which contains, at least, effective pixel information corresponding to, at most, (nH×nV) pixels per the picture plane of either of the one field or the one frame;

second signal generation means for interpolatively restoring, at least, those pixels of said second and third imaging/signals which have been omitted from said imaging, thereby generating second and third information signals each of which contains, at least, effective pixel information corresponding to, at most, (nH×nV)/4 pixels per the picture plane of either of the one field or the one frame; and signal output means for generating a predetermined video signal on the basis of said first information signal delivered from said first signal generation means and said second and third information signals delivered from said second signal generation means, and for delivering the generated video signal as an output of said high-definition imaging device.

14. A high-definition imaging device as defined in claim 13, wherein said first signal generation means includes means for generating a luminance signal through a predetermined matrix operation of a signal based on said first imaging signal delivered form said first imaging means and signals based on said second and third imaging signals delivered form said second imaging means, so as to interpolatively restore and deliver the pixels of, at least, said luminance signal.

15. A high-definition imaging device as defined in claim 13, wherein said second signal generation means includes means for generating first and second color difference signals through a predetermined matrix operation of a signal based on said first imaging signal delivered from said first imaging means and signals based on said second and third imaging signals delivered from said second imaging means, so as to interpolatively restore and deliver the pixels of, at least, said first and second color difference signals.

16. A high-definition imaging device which images a two-dimensional space that includes, at least, nH spatial sampling points in a horizontal direction and nV spatial sampling points (nV lines) in a vertical direction, totaling (nH×nV) spatial sampling points, and which delivers an information signal of a high-definition picture, comprising:

first imaging means including two, first and second two-dimensional solid-state imaging elements, for delivering first and second imaging signals, each of said first and second imaging elements having a pixel array which is configured of nH/2 pixels in said horizontal direction and nV/2 pixels (nV/2 lines) in said vertical direction, totaling (nH×nV)/4 pixels, said first and second imaging elements being arranged in a state in which they are offset ½ pixel pitch in said horizontal direction and ½ pixel pitch in said vertical direction from each other, said first and second imaging signals being delivered on the basis of outputs read from the respective solid-state imaging elements by sequential scanning, and containing at least one of luminance information and imaging pixel information obtained in relation to first color information, respectively, each of said luminance information and said pixel information corresponding to, at most, (nH×nV)/4 pixels per picture plane of one field;

second imaging means including a third two-dimensional solid-state imaging element, for delivering third and fourth imaging signals, said third imaging element having a pixel array which is configured of the nH/2 pixels in said horizontal direction and the nV/2 pixels (nV/2 lines) in said vertical direction, totaling the 9nH×nV/4 pixels, said third and fourth imaging signals being delivered on the basis of outputs read from said third solid-state imaging element by sequential scanning, and containing, at lest, imaging pixel information obtained in relation to second color information and third color information, respectively, each of said second color information and said third color information corresponding to, at most, (nH×nV)/8 pixels per the picture plane of the one field;

first signal generation means for interpolatively restoring, at least, those pixels of the first imaging signal of said first imaging means which have been omitted from the imaging, on the basis of imaged pixels of the second imaging signal, thereby generating a first information signal which contains, at least, effective pixel information corresponding to, at most, (nH×nV)/2 pixels per the picture plane of the one field;

second signal generation means for interpolatively restoring, at lest, those pixels of said second imaging signal of said first imaging means which have been omitted from said imaging, on the basis of imaged pixels of said first imaging signal, thereby generating a second information signal which contains, at lest, effective pixel information corresponding to, at most, the (nH×nV)/2 pixels per the picture plane of the one field;

third signal generation means for interpolatively restoring, at least, those pixels of the third imaging signal of said second imaging means which have been omitted from said imaging, thereby generating a third information signal which contains, at least, effective pixel information corresponding to, at most, the (nH×nV)/4 pixels per the picture plane of the one field;

fourth signal generation means for interpolatively restoring, at least, those pixels of the fourth imaging signal of said second imaging means which have been omitted from said imaging, thereby generating a fourth information signal which contains, at least, effective pixel information corresponding to, at most, the (nH×nV)/4 pixels per the picture plane of the one field; and video signal output means for generating a luminance signal and two color difference signals on the basis of the first, second, third and fourth information signals, and for delivering the generated signals as output of said high-definition imaging device.

* * * * *